May 1, 1962  J. H. ST. JOHN  3,032,707
OSCILLOGRAPHIC METHOD OF INTERNAL COMBUSTION ENGINE ANALYSIS
Filed Dec. 16, 1958  4 Sheets-Sheet 1

INVENTOR
JOHN H. ST JOHN

BY John Gibson Semmes
ATTORNEY

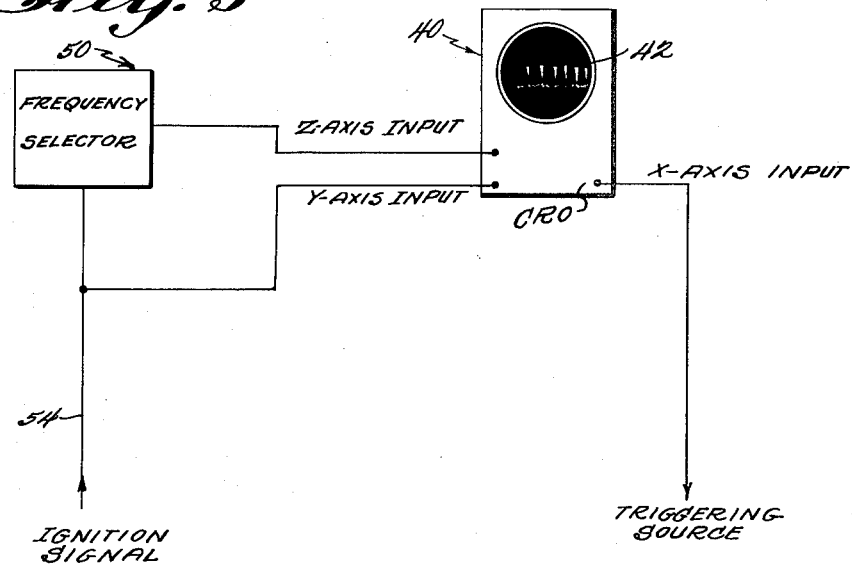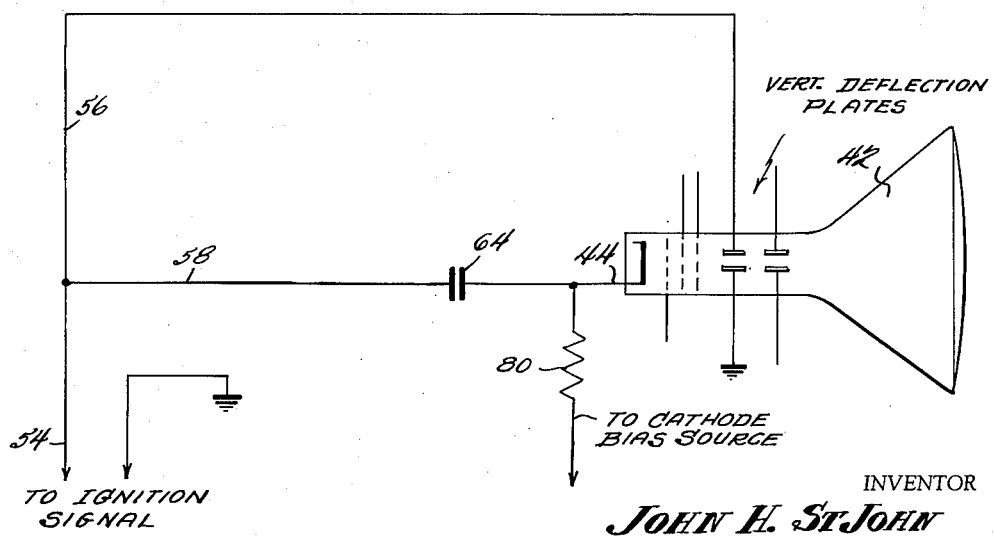

May 1, 1962 J. H. ST. JOHN 3,032,707
OSCILLOGRAPHIC METHOD OF INTERNAL COMBUSTION ENGINE ANALYSIS
Filed Dec. 16, 1958 4 Sheets-Sheet 3

INVENTOR
JOHN H. ST JOHN
BY John Gibson Semmes
ATTORNEY

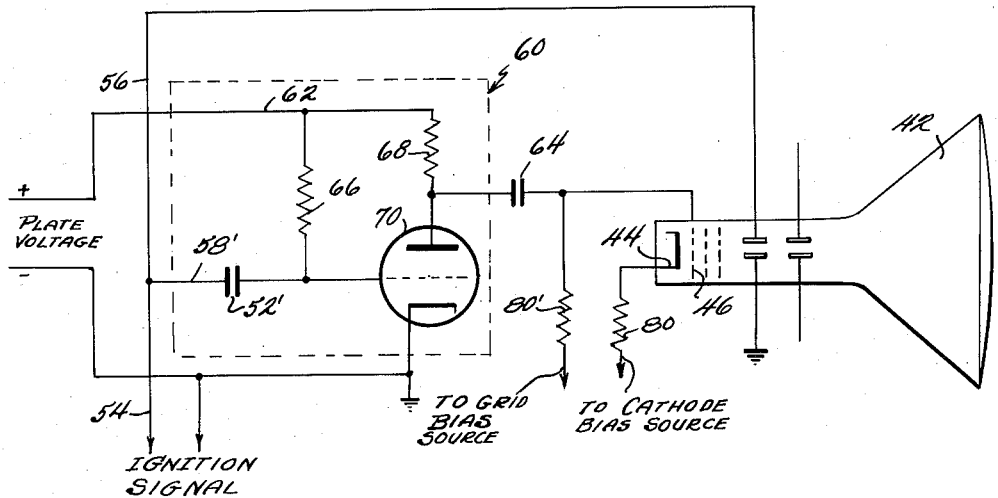
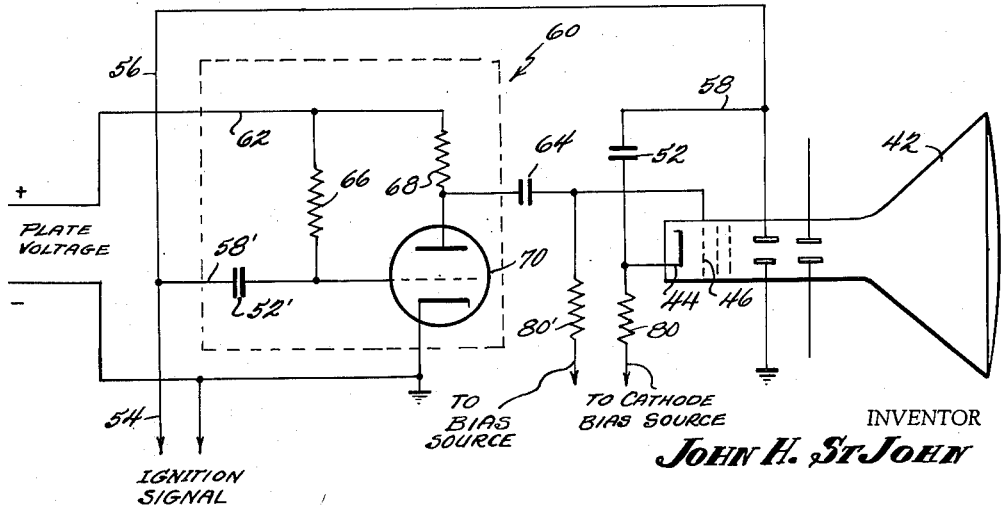

United States Patent Office 3,032,707
Patented May 1, 1962

3,032,707
OSCILLOGRAPHIC METHOD OF INTERNAL
COMBUSTION ENGINE ANALYSIS
John H. St. John, Bogota, N.J., assignor, by mesne assignments, to Marquette Corporation, Minneapolis, Minn., a corporation of Delaware
Filed Dec. 16, 1958, Ser. No. 780,722
13 Claims. (Cl. 324—16)

This invention relates to improvements in oscillographic presentations used in internal combustion engine analysis. More especially it is directed to a method for exaggerating the high voltage portion of the secondary ignition voltage pattern displayed on the oscilloscope. It has been determined that the ability to readily observe and measure this portion of the ignition voltage pattern makes possible improved accuracy and analysis of engine performance.

This is a continuation-in-part of copending Patent Application Serial No. 621,389 filed November 9, 1956 now U.S. Patent No. 2,875,402, dated February 24, 1959.

More specifically, the present invention is designed for use in connection with electrical testing systems, and particularly those for testing and indicating the condition of multi-cylinder combustion engines of the electrical ignition type, utilizing an oscilloscopic display and measurement of the electrical performance of the various components of the ignition system.

In testing systems of this nature a high degree of accuracy is required, but additionally, and of the utmost importance, there must be ease of reading depicted patterns. Known devices, including the cathode ray oscilloscope are used today in analyzing engine performance. One such system which has been found to be effective is disclosed in my copending application Serial No. 557,567, filed January 5, 1956, now abandoned, and entitled Engine Test and Display System.

The present invention is devised for use in combination with systems such as disclosed in the copending patent application aforesaid. To those skilled in the art, it will be readily appreciated that through employing a combination of the methods disclosed in the copending application and hereunder there is achieved rapid and accurate oscillographic analysis heretofore unobtainable as through the use of conventional oscillographic analysis systems. For instance, in practice, the time required for complete analysis of an internal combustion engine has been reduced 80%. Verification of this fact has been obtained from field operations.

In the known art, other than that covered by the assignee's copending patent application Serial No. 557,567, now abandoned, means have been provided for identifying one or more wave patterns selected from a plurality of such patterns particularly where displayed in parade fashion. Signals have thus been known to be intensified on a small scale for certainty of identification before displaying such signals otherwise in amplified form for analysis. In this known art, however, no specific area or portions of one or more waves have been electronically selected and set aside for oscillographic display and amplification. To the contrary, the present method is devoted to the creation of an improved oscillographic display system in which high frequency areas or portions only of the secondary ignition voltage pattern are uniquely selected and set aside for exaggerated or magnified display on the oscilloscope screen. In this manner, the exaggerated or magnified high frequency portion of the ignition "spike" can be readily observed in connection with measurement means such as a kilovolt scale superposed on the face of the oscillographic screen.

It is true that whereas the known art utilizes Z-axis modulation, it has been employed principally to protect oscillographic equipment against damage otherwise occurring through the cathode ray beam uncontrollably striking the screen and destroying its phosphorescent coating. Again such Z-axis modulation systems have been adapted to effect an "on-off" switching function. To the contrary, the Z-axis modulation system of applicant is utilized to illumine, brighten and amplify a portion selected by its frequency characteristic alone. Z-axis modulation is thus utilized for the purpose of rendering more visible the normal faint, high frequency trace of a secondary ignition voltage pattern, the Z-axis modulating voltage being uniquely derived directly from the high frequency portion itself of the signal being displayed.

The essence of the invention therefore resides in devising a method whereby the high frequency portion of the secondary ignition voltage has been isolated, set aside, so to speak, and captured to effect Z-axis modulation.

It is an object of the present invention to provide an improvement in oscillographic presentation which will give superior operation in permitting ease, accuracy and clarty of reading ionization voltage derived from a high tension or high voltage pickup from the ignition system.

"Ionization voltage" may be defined as that high voltage required to ionize the combustible mixture in an internal combustion engine and to initiate the arc across the spark plug gap as opposed to the lower voltage which maintains the arc across the gap.

This invention is particularly suitable, as for example only, when displaying a secondary ignition pattern on a cathode ray tube to visually indicate in a clearer manner the ionization voltage in a electrical ignition system as derived from a high tension pickup applied thereto. Under such circumstances the spikes or ionization lines of high voltage are of such short duration that when displayed on cathode ray tubes the ionization lines appear very faint. Conventionally, if the brightness is increased to facilitate ease of reading, the cathode ray tube will normally bloom and defocus the entire ignition pattern. The present system however is selective in operation between low frequency and high frequency transient phenomena. It might be said that the unique system accomplishes electronically what others have attempted to accomplish optically. The system, however is more practical than any such attempt to optically amplify a selected portion of a pattern because it leaves the trace substantially free of undesired distortion. One of the purposes of the electronic exaggeration nevertheless is to shape a portion of the pattern so that the most unskilled may observe and measure. A desired "paint brush" effect is obtained by sensing and exaggerating the high frequency portion of the "spike."

An object of this invention is to provide in oscillographic display an intensifier step which can cause or be made to cause oscilloscope defocusing, thus rendering a wider depicted pattern of the high frequency portion. It is also sought to present a widened and flat topped spike, the width of which facilitates vertical measurement as on a kv. calibrated scale.

Yet another object of invention is to provide the average mechanic with novel portable means for clearly discerning and accurately measuring high frequency transient phenomena at the locus of the automotive engine, regardless of daylight or other high ambient and adverse lighting conditions. This concept is adapted to give the average mechanic the electronic analysis skill hitherto reserved for the electronic technician sheltered under ideal laboratory conditions.

In the business of automotive maintenance and repair, it is well known that the basis for charging the car owner is derived from the labor hours of service personnel;

therefore, another object of invention resides in reducing the time required by service personnel (operators) to obtain a complete analysis of the ignition system of an internal combustion engine. This reduction in time resulting in an economic saving to the car owner.

There are different means of arriving at the ultimate ends sought and solved by the present invention. These include—

(1) Driving the cathode of the cathode ray oscilloscope tube more negative by voltages derived from the high frequency portions of the ignition signal (the preferred method).

(2) Driving the grid of the cathode ray oscilloscope tube more positive by voltages derived from the high frequency portions of the ignition signal.

(3) A combination of the first and second methods.

In consideration of the foregoing, it is to be remembered that the high voltage utilized to ionize the spark plug gap in battery ignition systems, is always a negative voltage. Particular reference is made to the necessity for phase inversion as in (2) above and where necessary as in (3) above. In any of these circumstances, the application of a positive voltage to the grid or a negative voltage to the cathode or a combination thereof, of sufficient amplitude, results in maximum instantaneous beam current and maximum brightness. Defocusing and/or blooming also occurs in the present method, causing such secondary voltages to yield more easily discernible traces on the screen of the cathode ray oscilloscope tube.

Other objects and advantages of the invention will be more readily apparent from the following detailed description of embodiments thereof, when taken together with the accompanying drawings, in which:

FIGURE 3 is a diagrammatic view of the overall system employed in accordance with the method of this invention.

FIGURE 4 is a schematic view of a circuit preferred in practising the invention.

FIGURES 7 and 8 illustrate circuitry used in practising related and modified methods and include other means than shown in FIGURES 5 and 6 for polarity reversing.

Figure 1:
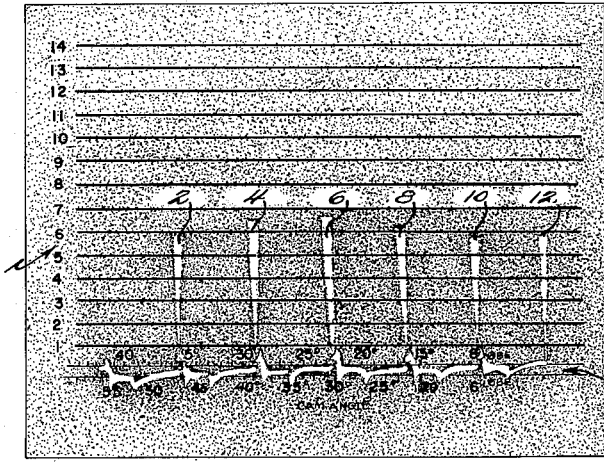
FIGURE 1 is a reproduction of a photograph taken from the screen of an oscilloscope displaying pattern of an operating ignition system embodying the present invention, and demonstrating the unique readability characteristics of exaggerated ionization voltage display.

In the drawings and following description, only those portions of an overall circuit for visually analyzing the operation of an internal combustion engine are included which are necessary to understand the present invention. It is to be understood that the information to be imparted to the cathode ray oscilloscope tube in the nature of transient phenomena is derived from information pickup devices including transducers, voltage dividers, etc. The actual association of the invention with an internal combustion engine to be tested and features such as the triggering circuit are not included since unnecessary to an understanding of this invention. For details in this connection, however, reference can be made to my aforementioned copending patent application Serial No. 557,567, now abandoned, which by reference is specifically incorporated herein.

In FIGURE 1 of the drawings a plurality of recurring high voltage spikes are shown at 2–12 inclusive. The unique results of the invention are here shown. Particular reference is made to the vertical presentations shown as in continuance of a normal oscillographic ignition pattern. It will be observed that the high voltage or ionization voltage area is the only portion of the ignition pattern that has been selected for electronic exaggeration or magnification. Accordingly, the low frequency voltage area of the pattern 14 remains substantially unchanged. Noteworthy is the fact that the topmost extremity of the exaggerated portion of the ignition volage displayed is relaively flat and well defined. This flatness corresponds in alignment with transversely disposed kilovolt lines on the calibrated scale which is preferably used in the method of the present invention.

It will be seen that in this application of the invention, the ionization lines of the wave forms, through defocusing and blooming have traces much wider than normal, and more readily discernible presentations, the height of which can be more readily observed and measured even under high ambient or adverse light conditions. The value of this resultant phenomena will be apparent to those skilled in the art and to mechanics whose duties call for rapid analysis at the locus of the vehicle engine. This invention thus adapts a laboratory oscilloscope to use at the field level by unskilled operators. It is also to be understood that the higher the voltage applied, the wider the ionization line appears at its top and hence the more easily readable it becomes. This increased width or spreading of the "spike" or ionization line at its top is due to the fact that voltage applied to modulate the Z-axis is directly proportional to the height of the pattern. The higher the voltage, the greater is the amount of defocusing and the spike or ionization line will spread at its top while the remainder of the pattern will be substantially unaffected.

Figure 2:
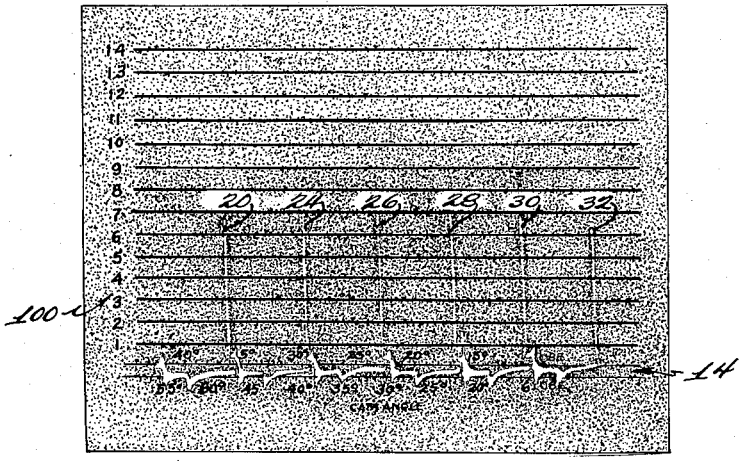
FIGURE 2 is a reproduction of another photograph taken from the screen of the same oscilloscope under identical operating conditions, the only change being the removal of the circuitry employed in practising the present invention. In this demonstrative figure of the conventional mode of presentation, the ionization voltage lines appear faintly, resulting in poor readability characteristics.

Turning now to FIGURE 2 of the drawings, the following is brought out by way of contrast. It will be noted that the vertical lines 22–32 conventionally representing ignition firing voltages are now fine vertical lines which are extremely difficult to read with reference to the kilovolt scale 100 provided on the oscilloscope screen. In actual practice the presence of high ambient light conditions makes these fine vertical lines almost impossible to observe, whereas the pattern reproduced by the present method and indicated in FIGURE 1 is quite readable under such conditions. Particularly is this contrast noteworthy when one considers the difficult operating conditions under which the average garage or service station mechanic operates. FIGURES 1 and 2 were prepared by setting up an actual oscillographic engine analyzer now in commercial production as in patent application Serial No. 557,567 (above) and photographing the pattern appearing on the screen of this one unit on the same engine; employing the preferred intensifier circuit in the FIGURE 1 presentation and eliminating the same in the FIGURE 2 presentation. There was no manipulation of any controls made in effecting the transfer depicted in FIGURES 1 and 2. This was done in order to make an accurate comparison possible. The figures are exact reproductions of photographs taken. Noteworthy is the fact that the low frequency portions (at the base line) of the pattern in each FIGURES 1 and 2 are the same. Comparing FIGURES 1 and 2 it will be obvious that although the high frequency portion (ionization lines) are defocused and brightened as shown in FIGURE 1, the remainder of the pattern 14 is unaffected. Accordingly the low frequency portions 14 of the respective FIGURES 1 and 2 patterns remain the same.

Referring now to FIGURE 3 of the drawings, the following is to be noted.

The circuitry employed in carrying out this invention is identified as the "Frequency Selector" 50. In these drawings, the basic cathode ray oscilloscope is indicated at 40, the same including CRT 42. The ignition signal, it will be noted, is passed through frequency selector 50 to modify a portion thereof precedent to its application to the Z-axis input of the cathode ray oscilloscope. This ignition signal is simultaneously applied to the Y-axis input of the oscilloscope without modification. The details of effecting this are shown in the succeeding drawings. For purposes of simplicity, however, the horizontal movement of the cathode ray beam has been described as X-axis modulation; the vertical movement of the electron beam has been described as Y-axis modulation, this nomenclature being common in presentations against cartesian coordinates; and Z-axis modulation as that governing the brightness of the trace per se.

X-axis modulation is obtained in the normal manner by utilizing conventional sweep circuits controlled by the voltage generated at one spark plug of the engine.

Y-axis modulation is obtained by applying in the normal manner the high tension voltage generated by the ignition coil to the vertical deflection circuits of the oscilloscope.

Connected to the Y-axis input is shown a frequency selector which offers low impedance to high frequency phenomena, the output of which is fed to Z-axis input in the oscilloscope in the normal manner. The frequency selector in its preferred form consists of a capacitor having a capacitive reactance selected to give the desired exaggeration to the ignition high frequency portion pattern. This type of frequency selecter is shown in detail in FIGURE 4 and more specifically described in the specification directed thereto.

In FIGURE 4 a cathode 44 of a cathode ray oscilloscope tube 42 is schematically shown. The ignition signal is conducted through conductor 54 to the cathode ray oscilloscope; however, the signal passes simultaneously to the vertical plates of the tube through conductor 56 as it also is impressed on the cathode 44 through conductor 58 and capacitor 64. The frequency selective characteristics of capacitor 64 control the voltages conducted to and impressed on cathode 44 of the CRT. By application of this resultant negative voltage to the cathode 44 through capacitor 64 there results increased instantaneous beam current and greater brightness. This result is explained by the fact that the high voltage portion of the ignition signal is always negative in battery ignition systems and it is this portion which is applied to the purpose at hand. By design, the conventional battery ignition system employs negative voltage to fire the plugs. The reasoning underlying this design is obvious in that considerably less ignition voltage is required to ionize the spark plug gap with negative than with positive voltage.

Figure 5:
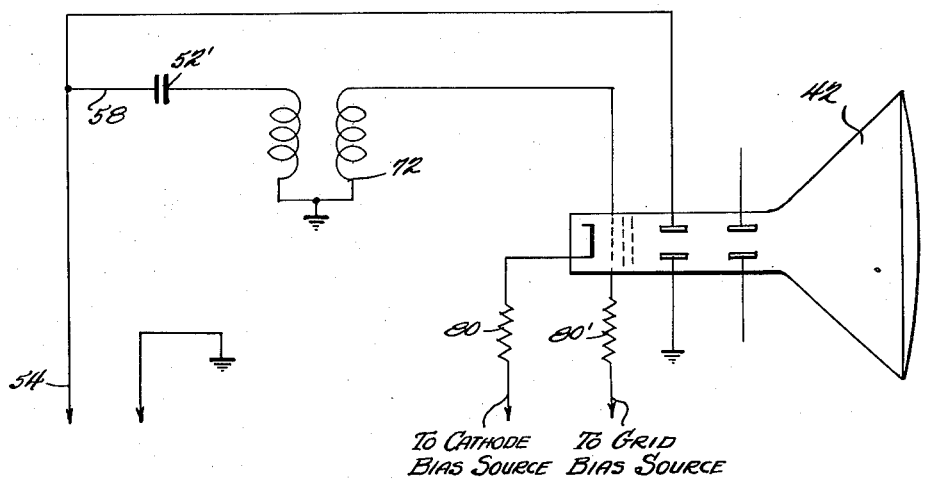
FIGURES 5 and 6 illustrate modifications of circuitry employed in practise of a related modified method and include means for polarity reversing.

In the FIGURE 5 circuit the polarity of the negative voltage derived from the ignition signal is reversed by transformer 72 to drive the grid of the cathode ray more positive in accomplishing the desired results herein. This polarity reversal becomes necessary when one considers that the voltage utilized is negative, bearing in mind that it is this negative voltage which is required to ionize the spark plug gap in engine operation.

Figure 6:
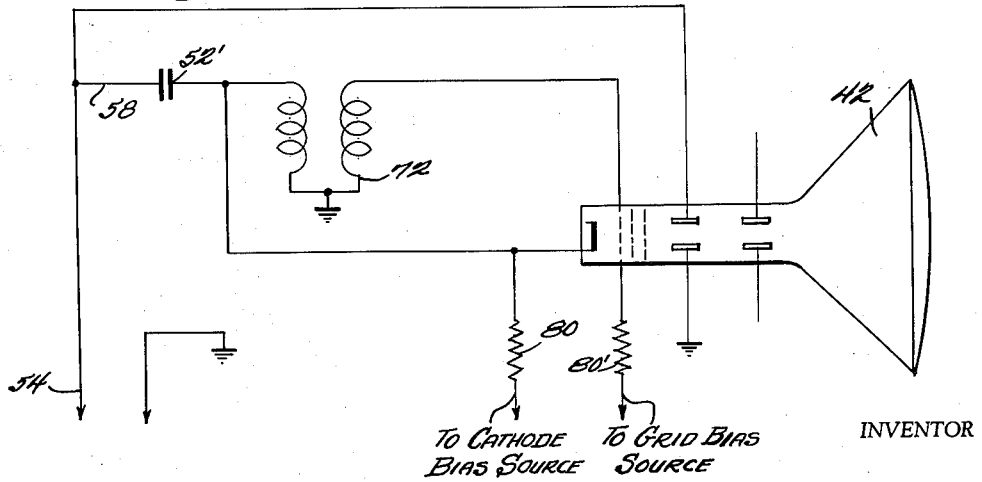

The FIGURE 6 circuit combines the intensifier elements of the circuits described in FIGURES 4 and 5, and includes the polarity reversing transformer 72 so necessary to drive the grid more positive simultaneously as the cathode is driven more negative, resulting in exaggeration of the high voltage spike, as shown in FIGURE 1. Other means of accomplishing this result are described with respect to FIGURES 7 and 8.

The intensifier circuit shown in FIGURE 7 is one means of effecting the desired result in accordance with the present invention. Plate voltage lead of the supply source in the overall circuit is indicated at 62 and said conductor being adapted to impress on the circuit a positive voltage in the nature of 250 volts, for example. Conductor 62 leads to tube 70 and via 100K resistor 68 thence to the plate of tube 70.

Ignition signals from the engine ignition system per se are impressed simultaneously on the oscillographic vertical deflection plates and on capacitor 64. The capacitor 64 has a value selected to offer low impedance to the high frequency portions of the ignition system voltage, this being the same voltage as is applied to the vertical deflection plates aforesaid. The value of capacitor 52′ is determined by the range of frequencies encountered in the system offering high impedance to low frequency portions and vice versa. For instance a 500 microfarad capacitor is usable with a 2API-A CRT. The high frequency portions so selected are applied to the grid of tube 70 which tube preferably consists in the circuit of one-half of a 12AU7 or 12AT7 or the equivalent. This tube is held strongly conducting by holding the grid thereof slightly positive by virtue of a 3.9 megohms resistor 66 interposed as shown between conductors 62 and 58′. The amplified signal is conducted through the conductor shown with a 1000 mmf. capacitor 64 to the grid 46 of the cathode ray oscillographic tube, driving this grid more positive and thereby exaggerating the high frequency portions of the pattern. Bias for the cathode ray oscillographic tube is diagrammatically indicated as applied to the cathode of the tube through a 47K ohm resistor 80 and through the 3.9 megohm resistor 80′ to the grid of the CRT.

In ignition analysis, capacitor 52′ is of an order which may be coupled to the input with negligible loading to obtain the desired results. By means of applying the so-effected high voltage negative spikes, through phase inversion caused by the vacuum tube circuit 60, the grid of the cathode ray oscilloscope tube is driven more positive on maximum peaks which accentuates the pattern depicted on the screen as discussed hereinbefore.

Referring to FIGURE 8, the intensifier circuit shown is identical with that of FIGURE 7 except that capacitor 52 is connected from source of ignition signal to the cathode 44 of the CRT. This serves to drive the cathode of the CRT more negative simultaneously as the grid thereof is driven more positive. The conduct of these capacitors 52 and 52′ has been defined hereinbefore as offering low impedance to HF phenomena. It may be stated however that a satisfactory value for capacitance 52 and 52′ identified in trade as 2API-A is 500 mmf. This capacitance would of course vary as the deflection and beam sensitivities of varying CRT's may vary.

Manifestly, the overall circuit and the application of the present invention to circuits of different natures can be modified within the scope of the present invention without departing from the spirit thereof as defined in the appended claims. For instance, an electrical filter of equivalent characteristics to the capacitive reactance could be substituted therefor without departing from the invention. The above system is equally well adapted to electromagnetic deflection cathode ray oscilloscopes.

I claim:

1. In oscillographic analysis of internal combustion engines wherein ignition voltage patterns are displayed on the screen of a cathode ray tube, the improvement resulting in modifying the observed pattern for facile observation including the steps of: sampling voltages applied to vertical deflection circuitry; selecting a frequency range of said sampled voltages; and applying the voltages within the selected frequency range to modulate the Z-axis of the cathode ray tube.

2. In oscillographic analysis of internal combustion ignition systems wherein secondary ignition voltage patterns are displayed on the screen of a cathode ray tube, the improvement resulting in exaggerating for facile observation the high voltage spikes including the steps of: sampling voltages applied to vertical deflection circuitry; selecting the high frequency range portion of said sampled voltages; and applying the selected high frequency voltages to modulate the Z-axis of the cathode ray tube.

3. The method according to claim 2 wherein applying the selected high frequency portion of sampled voltages includes driving the grid of the cathode ray tube more positive by signal derived from the high frequency portion of sampled voltages.

4. The method according to claim 1 wherein selecting of the frequency range of sampled voltages is effected by electrical filtering.

5. The method according to claim 2 wherein selecting of high frequency portions of sampled voltages is by means of capacitive reactance.

6. The method according to claim 3 wherein selecting of high frequency portions of sampled voltages is by means of capacitive reactance.

7. The method according to claim 1 wherein applying the selected high frequency range of sampled voltages includes driving the cathode of the cathode ray tube more negative by signal derived from the selected frequency range of said sampled voltages.

8. The method according to claim 1 wherein selecting of high frequency portion of sampled voltages is by means of capacitive reactance.

9. The method of claim 1 wherein applying the selected frequency range of sampled voltages includes simultaneously driving the cathode of the cathode ray tube more negative and the grid of the cathode ray tube more positive.

10. The method of claim 7 wherein selecting frequency range of sampled voltages is by means of capacitive reactance adapted respectively to the grid and to the cathode of the cathode ray tube.

11. In internal combustion engine analysis wherein an oscilloscope is triggered by signals derived from an engine ignition system, a method of displayably exaggerating ignition high voltage spikes traced oscillographically, including the simultaneous acts of: attenuating secondary voltages derived from the engine ignition system; applying the attenuated voltages to oscillographic vertical deflection circuitry, sampling voltages applied to vertical deflection circuitry; selecting the high frequency portion of sampled voltages; and applying the selected high frequency portion to modulate the Z-axis of the cathode ray tube.

12. The method according to claim 11 in which the selecting of high frequency portion of sampled voltages is by electrical filtering.

13. The method according to claim 11 in which the selecting of high frequency portions of sampled voltages is effected by capacitive reactance.

References Cited in the file of this patent

UNITED STATES PATENTS

| | | |
|---|---|---|
| 2,787,726 | Benoit | Apr. 2, 1957 |
| 2,787,760 | Sammis et al. | Apr. 2, 1957 |
| 2,812,472 | Welliver | Nov. 5, 1957 |
| 2,875,402 | St. John | Feb. 24, 1959 |

FOREIGN PATENTS

| | | |
|---|---|---|
| 220,251 | Switzerland | June 16, 1942 |

UNITED STATES PATENT OFFICE
Certificate of Correction

Patent No. 3,032,707                                                             May 1, 1962

John H. St. John

It is hereby certified that error appears in the above-numbered patent requiring correction.

In the drawings, the present Sheet 1 should be cancelled and the attached Sheet 1 substituted therefor, as part of the Letters Patent.

Signed and sealed this 6th day of November 1962.

[SEAL]

Attest:

ERNEST W. SWIDER,
*Attesting Officer.*

DAVID L. LADD,
                                                                                                 *Commissioner of Patents.*